United States Patent [19]

Belart

[11] 4,354,714
[45] Oct. 19, 1982

[54] HYDRAULIC BRAKE SYSTEM HAVING WHEEL SLIP CONTROL

[75] Inventor: Juan Belart, Walldorf, Fed. Rep. of Germany

[73] Assignee: ITT Industries, Inc., New York, N.Y.

[21] Appl. No.: 193,215

[22] Filed: Oct. 2, 1980

[30] Foreign Application Priority Data

Oct. 24, 1979 [DE] Fed. Rep. of Germany ....... 2942980

[51] Int. Cl.³ .............................................. B60T 8/02
[52] U.S. Cl. ..................................... 303/114; 303/119
[58] Field of Search .............................. 303/113–119, 303/68–69, 6 R, 6 A, 50–56, 10; 188/345, 151 A, 359, 181; 60/548, 564

[56] References Cited

U.S. PATENT DOCUMENTS 3,729,235 4/1973 Bach et al. .......................... 303/114
4,123,117 10/1978 Adachi ............................... 303/114

FOREIGN PATENT DOCUMENTS 2443545 3/1976 Fed. Rep. of Germany .
2745354 4/1979 Fed. Rep. of Germany .
2060798 5/1981 United Kingdom ................ 303/119

Primary Examiner—Douglas C. Butler
Attorney, Agent, or Firm—John T. O'Halloran; Alfred C. Hill

[57] ABSTRACT

Hydraulic brake systems are known which include master cylinders, wheel brake cylinders and wheel slip control apparatus in which a fluid flow from a fluid source to the pressure chamber of the master cylinder is controlled by a valve device. The wheel slip control apparatus controls valves and modulates the pressure in the associated wheel brake cylinder in the event of an imminent locked condition of a wheel. In the known systems the cup seal of the master cylinder is subjected to excessive loads and, moreover, it is not possible to determine if the cup seal leaks. Therefore, in accordance with the present invention a valve device is provided coupled to the master cylinder pressure chamber and the front wheel brake cylinders which is opened dependent on a differential of pressure between the pressure in the master cylinder pressure chamber and the pressure in the front wheel brake cylinders, with the pressure in the front wheel brake cylinders being required to be lower than the pressure in the master cylinder pressure chamber.

20 Claims, 2 Drawing Figures

HYDRAULIC BRAKE SYSTEM HAVING WHEEL SLIP CONTROL

BACKGROUND OF THE INVENTION

This invention relates to a hydraulic brake system including a master cylinder, wheel cylinders, a wheel slip control (antiskid) apparatus, a valve device controlling a fluid flow from a fluid source to the pressure chamber of the master cylinder, and valves actuated by the wheel slip control apparatus to control, in the event of an imminent locked condition of a wheel, the pressure in the associated wheel cylinder independently of the pressure in the pressure chamber.

A device of this type is known from German Pat. DE-OS 2,443,545. The piston of a master cylinder isolates the master cylinder pressure chamber from a fluid chamber receiving fluid under pressure from the fluid flow of the hydraulic brake booster. Axial bores in the master cylinder piston connect the fluid chamber to the pressure chamber, the bores are, however, covered by the cup seal of the master cylinder piston in the pressure chamber. In this manner, the effect of a check valve is obtained permitting exclusively a fluid flow from the fluid chamber to the master cylinder pressure chamber while inhibiting flow in the opposite direction. During a normal brake application, the pressure building up in the pressure chamber will be the same as in the fluid chamber so that fluid flow does not take place through the axial bores. However, if the wheel slip control apparatus intervenes, lowering the pressure in a wheel cylinder and connecting the wheel cylinder again to the master cylinder after the pressure decrease has taken place, the pressure in the pressure chamber will be slightly lower than in the fluid chamber for a short time after connection to the pressure chamber. Fluid will be supplied through the axial bores immediately so that the fluid volume in the pressure chamber cannot become exhausted.

A brake system of this type, however, subjects the cup seal of the master cylinder piston to excessive loads. Moreover, it is not possible to determine cup seal leaks without removing the cup seal.

From German Pat. DE-OS 2,745,354 a brake system is known in which from a specific amount of piston stroke on the pressure chamber of the master cylinder is connected to the fluid flow of the hydraulic brake booster. This stroke-dependent control is, however, very expensive and necessitates likewise a dual action of the master cylinder cup seals so that these are again subjected to an enormous load.

SUMMARY OF THE INVENTION

It is an object of the present invention to provide a valve device which makes available to the master cylinder pressure chamber an additional fluid volume dependent on the fluid volume discharged from the wheel cylinders, so that the master cylinder fluid volume cannot become exhausted. It is possible to check the cup seal of the master cylinder piston for leaks, and the cup seal is not subjected to additional loads.

A feature of the present invention is the provision of a hydraulic brake system for a vehicle comprising: a master cylinder having a pressure chamber; at least two wheel brake cylinders; at least two wheel slip control valves each coupled between the pressure chamber and a different one of the two brake cylinders to control the pressure in the associated one of the two brake cylinders independently of the pressure in the pressure chamber in the event of an imminent locked condition of a wheel, the pressure in each of the two brake cylinders being lower than the pressure in the pressure chamber by a predetermined amount; and a valve device coupled to a pressurized fluid source, the pressure chamber and the two brake cylinders to control fluid flow from the fluid source to the pressure chamber, the valve device being responsive to a differential of pressure between the pressure in the pressure chamber and the pressure of each of the two brake cylinders.

This arrangement ensures that the master cylinder piston is not displaced, not even in the event of a controlling action by the wheel slip control apparatus, because it is during brake pressure discharge from the wheel cylinders that the pressure chamber of the master cylinder is connected to the fluid flow of the hydraulic brake booster. Neither is the cup seal of the master cylinder piston subjected to excessive loads because it is not required to perform mechanical movements.

A particularly favorable embodiment is obtained in that the valve device is opened above a specific pressure level in the pressure chamber. Thus, the pressure chamber is directly connected to the fluid flow so that the further increase in braking force no longer occurs as a result of a displacement of the master cylinder piston, but of controlled delivery of fluid under pressure. This affords the advantage of permitting a limitation of the length of brake pedal travel without loss a braking force. Thus, there result advantages with regard to mounting.

If, from the specific pressure level on the hydraulic brake booster is fully activated, the booster piston of the hydraulic brake booster is immovably locked in place in the actuating direction and the limit position of the brake pedal is defined. In an advantageous embodiment, the booster piston is hydraulically locked in position by arranging for a valve, which is actuated by the pressure of the fluid flow, to shut off a fluid chamber whose volume becomes smaller as the booster piston moves in the actuating direction. The isolated volume in the fluid chamber cannot be compressed so that the booster piston is hydraulically locked in position. In order to have a feel at the brake pedal even with the booster piston locked in place, a travel/force simulator is provided at the actuating rod of the hydraulic brake booster. In an advantageous embodiment herein, the travel/force simulator is a stacked disc spring assembly penetrated by the central piston and engaged between the central piston and the piston section actuating the brake booster. Further displacement of the central piston can only take place with the application of a high force in opposition to the pressure acting on the central piston. In the presence of such a high force, the disc spring assembly will be compressed by an amount which will be felt at the brake pedal. In order to limit relative axial movement of the piston section and the central piston, they are connected to each other by a lost-motion coupling.

The valve device comprises advantageously a piston urged into sealing engagement with a valve seat by means of a spring, a first end surface of the piston being acted upon by the fluid in the pressure chamber in the sense of opening the valve device, and a second end surface of the piston being acted upon by the pressure in the wheel cylinders in the sense of closing the valve device. As a result of this structure, the valve device will release the fluid flow to the pressure chamber immediately if the pressure in a wheel cylinder has dropped below a specific pressure differential.

In order to avoid depletion of the pressure chamber in the event of a failure of fluid flow, the fluid flow is directed through a check valve opening only in the direction of the pressure chamber.

An embodiment of the valve device which is straightforward from the construction point of view results from a multiple stepped piston whose first and second annular surfaces are acted upon by the pressures of first and second wheel cylinder, respectively, in the sense of closing the valve device, while a third annular surface lying opposite to the first and second annular surfaces is acted upon by the pressure of the pressure chamber in the sense of opening the valve device. In order to achieve largest possible independence of such a piston pressure control from other pressures acting on the piston, the effective areas of the first plus second annular surfaces are chosen such as to be equal to the effective area of the third annular surface.

Thus, independently of the pressure control behavior, one end surface of the stepped piston is actuatable by the pressure of the pressure chamber in opposition to the spring force, and the other end surface of the stepped piston is adapted to be exposed to atmospheric pressure. Thus, it is only the size of the end surface exposed to the pressure of the pressure chamber that determines the force necessary to ensure piston displacement for continuous fluid flow into the pressure chamber. The change-over pressure from which the pressure chamber is connected to the fluid flow may be determined by the spring force. In order to avoid a sudden pressure surge in the master cylinder pressure chamber, the fluid flow is adapted to the pressure level in the pressure chamber. The most straightforward way to achieve this is to arrange for the fluid flow to be equal to the controlled fluid flow of the hydraulic brake booster.

An embodiment of the valve device which is simple from the construction point of view is achieved in that the piston section providing the end surface exposed to pressure of the pressure chamber terminates in a chamber communicating with the fluid flow, with the end of this piston section, which is constructed as a valve cone, closing an opening towards the pressure chamber by seating engagement therewith. If the valve cone has an axial bore connecting the control chamber bounded by the third annular surface to the pressure chamber, bores in the housing or conduits connecting the pressure chamber to the control chamber which are difficult to provide may be dispensed with.

In a brake system of this type, it is possible to provide the cup seal of the master cylinder piston with a warning device providing a warning indication in the event of a pressure buildup within its inner chamber. In a simple embodiment, an opening of the piston which is arranged in a sealed relationship to the inner chamber is closed by fluid-tight engagement with a rubber-type lamella during periods of high fluid flow from the pressure chamber to the reservoir. Such an arrangement ensures that fluid is at all times allowed to flow from the reservoir into the pressure chamber because it is in the direction that the lamella releases the opening.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
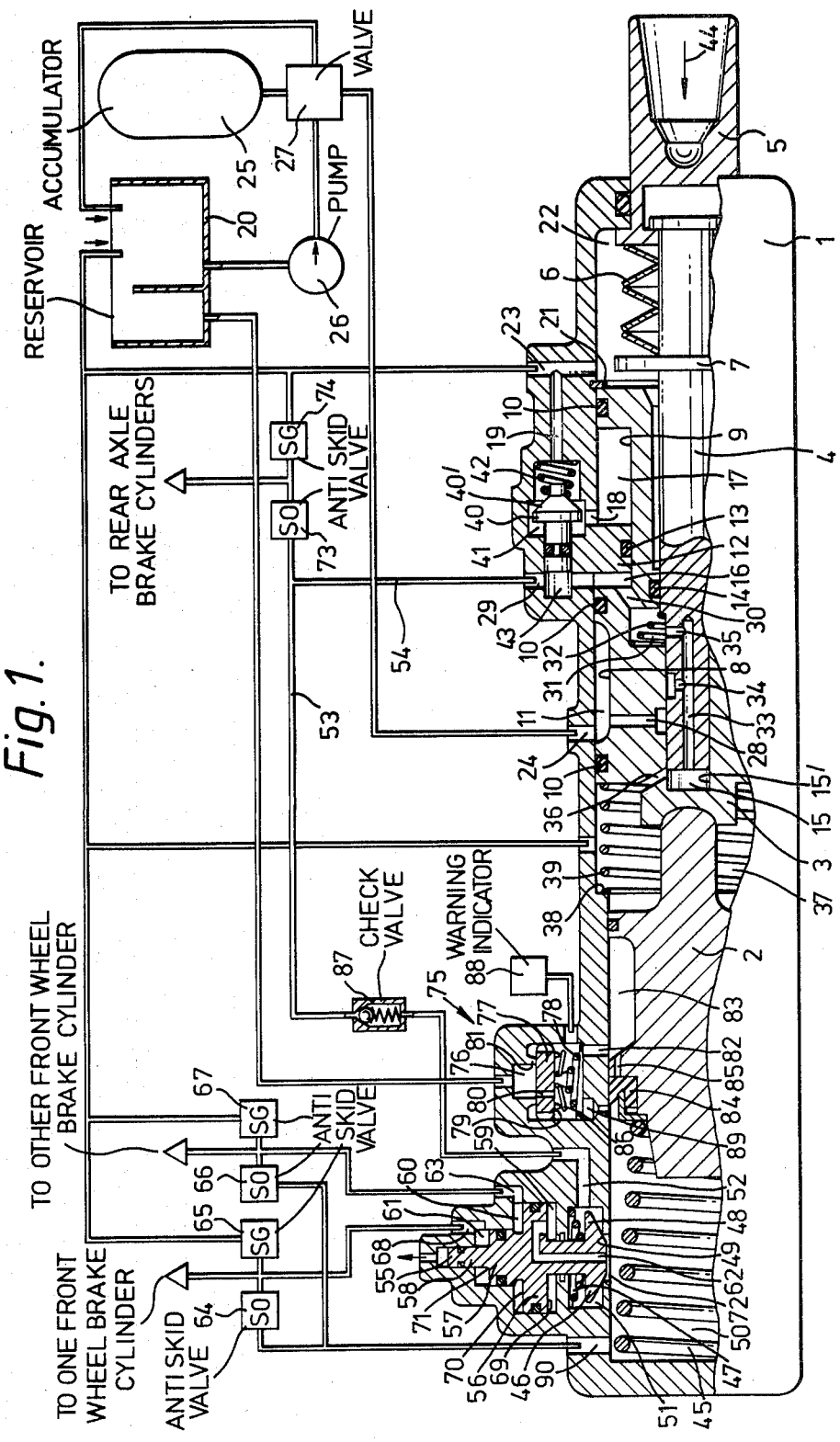
FIG. 1 is a partial longitudinal cross sectional view of a master cylinder of a brake system constructed in accordance with the principles of the present invention.

In FIG. 1, reference numeral 1 designates the housing of the master cylinder, reference numeral 2 the master cylinder piston. The brake booster preceding the master cylinder includes a booster piston 3 and a central piston 4. Central piston 4 slides in a coaxial bore 15 of booster piston 3 with a seal 14 sealing central piston 4 to bore 15 approximately in the middle thereof. Central piston 4 is controlled by means of a piston section 5 extending out of housing 1 and connected to the brake pedal (not shown). Piston section 5 bears against central piston 4 by means of an axially stacked disc spring assembly 6 engaged between piston section 5 and a collar 7 of central piston 4. In this arrangement, disc spring assembly 6 is penetrated by central piston 4. Central piston 4 and piston section 5 are mechanically connected by means of a lost-motion coupling 5' so that the pistons are axially movable relative to each other within limits.

Booster piston 3 has on its periphery two circumferential grooves 8 and 9 which are isolated from the other chambers by fluid-tight seals 10 on the right and left hand side of grooves 8 and 9.

The first chamber formed between groove 8 and housing 1 is used as an inlet chamber 11. The second chamber which is bounded by groove 9 and housing 1 is subdivided into two compartments, the booster chamber 16 and a fluid chamber 17, by a projection 12 which extends from housing 1 and is in fluid-tight engagement with the bottom of groove 9 by means of a seal 13. Fluid chamber 17 communicates with an unpressurized reservoir 20 via bores 18 and 19. The end surface of booster piston 3 on the side close to disc spring assembly 6 is in abutment with a stop 21 provided in the interior wall of housing 1. Chamber 22 which is bounded by housing 1 and booster piston 3 likewise communicates with unpressurized reservoir 20 via a bore 23.

Inlet chamber 11 communicates with a fluid accumulator 25 via a port 24. Fluid accumulator 25 is charged by a pump 26 delivering fluid under high pressure from unpressurized reservoir 20 into accumulator 25. Valve device 27 monitors the accumulator pressure, switching pump 26 off upon attainment of a specific pressure level, or returning the excess of fluid to reservoir 20.

Booster piston 3 has a radial bore 28 connecting inlet chamber 11 to bore 15 in the booster piston. In the position shown, bore 28 is closed by central piston 4 so that the pressurized fluid cannot flow into other chambers.

Central piston 4 includes an axial bore 33 and radial bores 34 and 35 connecting an intermediate space 31 with the internal chamber 15' of bore 15. Through bore 30, intermediate space 31 communicates with booster chamber 16. In the piston positions shown, bore 15 communicates, via opening 36, with unpressurized chamber 37 which is bounded by booster piston 3 and master cylinder piston 2. Unpressurized chamber 37 is connected to reservoir 20.

A spring 39 which is in abutment with booster piston 3 in unpressurized chamber 37 and bears against a stop 38 in housing 1 defines the illustrated rest position of booster piston 3.

Another spring 32 which is situated in intermediate space 31 is engaged between booster piston 3 and central piston 4 to maintain central piston 4 in the rest position shown.

Parallel to booster piston 3, housing 1 accommodates a valve 40 in a valve chamber 41 provided between bore 18 and bore 19. Valve 40 which is constructed as a piston slides in a fluid-tight relation in a bore 43 leading from port 29 of booster chamber 16 to valve chamber 41. In the presence of a high pressure in booster chamber 16, the valve head 40' of valve 40 will be urged into fluid-tight engagement with bore 19 opening into valve chamber 41 in opposition to the force of valve spring 42. Because movement of booster piston 3 in the actuating direction 44 will reduce the volume of fluid chamber 17, booster piston 3 can no longer be displaced in actuating direction 44 with fluid chamber 17 in fluid-tight isolation by closed valve 40. Thus, booster piston 3 is hydraulically locked in position.

Booster piston 3 acts directly on master cylinder piston 2 which is held in abutment with booster piston 3 by a return spring 45. Provided perpendicular to the actuating direction 44 of master cylinder piston 2 is a multiply stepped piston 55 whose respective sections slide in, and are sealed to, housing 1. At its end 48 close to the pressure chamber 50, the piston is constructed as a valve cone 46 urged into seating and sealing engagement with an opening 49 towards pressure chamber 50 by means of a spring 47. Thus, chamber 51 in which valve cone 46 moves is in fluid-tight isolation from the other chambers and communicates, via port 52 and lines 53 and 54, with the controlled fluid flow of the brake booster.

Line 53 includes a check valve 87 opening towards pressure chamber 50 and intended to protect pressure chamber 50 against fluid losses in the event of brake booster circuit leakage.

Connected to chamber 51 is another pressure chamber which is split into a control chamber 59 and a control chamber 60 by the largest-diameter section 56 of piston 55.

Control chamber 59 is in communication with pressure chamber 50 of the master cylinder via bore 62 which extends axially through valve cone 46.

Via port 63, control chamber 60 is pressurized by the pressure of a wheel brake cylinder which receives its pressure from pressure chamber 50 via a valve 66.

Adjacent to control chamber 60 is control chamber 61 which is bounded by the smaller section 57 of piston 55 and housing 1. Via a port 68, control chamber 61 is pressurized by the pressure of another wheel brake cylinder which likewise receives its pressure from pressure chamber 50 via a valve 64.

Section 57 of piston 55 terminates in a core or smallest diameter section 58 whose end surface is exposed to atmospheric pressure.

The annular surface 69 of piston 55 acting in control chamber 59 corresponds to the sum of annular surface 70 acting in control chamber 60 and annular surface 71 acting in control chamber 61.

In addition to the annular surfaces, the end surface of valve cone 46 is acted upon by the pressure of pressure chamber 50. The force on the end surface of valve cone 46 must be greater than the force of spring 47 in order to maintain piston 55 displaced and opening 49 open.

The wheel brake cylinders of the front axle are connected to pressure chamber 50, with each wheel brake cylinder being assigned a respective valve 64 and 66 open in the de-energized state and adapted to cut off fluid flow from pressure chamber 50. Further, another two valves 65 and 67 are provided which are closed in the de-energized state, so that with valves 64 and 66 closed and valves 65 and 67 open, fluid is allowed to escape from the wheel brake cylinders. This fluid is returned to reservoir 20.

It is essential in this arrangement that control chambers 60 and 61 are in direct communication with the wheel brake cylinders so that a decrease in the wheel brake cylinder pressure results in a decrease in the pressure in the associated control chamber.

The wheel brake cylinders of the rear axle are directly connected to the controlled fluid flow of the brake booster and are disregarded in the description of the mode of operation. They are also assigned a valve 73 and 74 controlling the wheel brake cylinder pressure dependent on control commands issued by a wheel slip control apparatus.

The cup seal 84 of master cylinder piston 2 has an associated warning device 75. In a separate chamber 76 provided in housing 1 is a piston 77 which is urged into sealing engagement with a valve seat 81 by a spring 78. Piston 77 has a small opening 80 in front of which a rubber-type lamella 86 is arranged which is held at a small distance from opening 80 by an edge 79, so that fluid flowing slowly is able to pass through opening 80 in either direction.

Chamber 76 is in communication with unpressurized reservoir 20, a breather bore 89 connects chamber 76 to pressure chamber 50, another opening 82 connects chamber 76 to leakage chamber 83 which is located behind cup seal 84 of master cylinder piston 2. Longitudinal bores 85 connect leakage chamber 83 to pressure chamber 50. However, cup seal 84 closes bores 85 in pressure chamber 50 so that, with cup seal 84 intact, no pressure fluid is allowed to flow from pressure chamber 50 into leakage chamber 83.

If cup seal 84 leaks, actuation of master cylinder piston 2 will cause fluid under high pressure to flow through bores 85 into leakage chamber 83 and, hence, into the lower part of chamber 76. The fluid tends to flow into an unpressurized space through opening 80. Because the fluid flow is very strong, the rubber-type lamella 86 will move into fluid-tight engagement with opening 80 so that pressure will build up below piston 77 in chamber 76. This pressure will activate a pressure-responsive warning indicator 88. Cup seal leakage is thereby indicated.

The operation of the hydraulic brake system is as follows. If central piston 4 is shifted relative to booster piston 3, opening 36 will be closed, and radial bore 28 in booster piston 3 will overlap radial bore 34 in central piston 4. Fluid is thus allowed to flow from inlet chamber 11 and the bores provided in booster piston 3 and central piston 4 into intermediate space 31 and booster chamber 16. From booster chamber 16, fluid is communicated through port 29 and line 54 directly to the wheel brake cylinders of the rear axle.

The pressure metered into booster chamber 16 acts likewise on the adjacent annular surface of booster piston 3 so that the resultant force of pressure on this annular surface acts directly on master cylinder piston 2 which is held in abutment with booster piston 3. Master cylinder piston 2 will be displaced, cup seal 84 will overtravel breather bore 89, and a pressure will build up in pressure chamber 50.

Through port 90, the pressure in pressure chamber 50 will propagate to the wheel cylinders of the front axle. At the same time this pressure will build up in control chambers 60 and 61. Annular surfaces 70 and 71 are thus acted upon by pressure in the closing direction, while annular surface 69 in control chamber 59 is acted upon by the pressure of pressure chamber 50 in the opening direction. Because of the geometrical dimensions, the action of forces on piston 55 counterbalance each other.

In chamber 51 valve cone 46 is largely pressure-balanced so that the fluid pressure prevailing in chamber 51 effects no force on piston 55. If the application of force is desired, opening 49 must be dimensioned such that valve cone 46 has an annular surface which is acted upon by the pressure of chamber 51.

End surface 72 of valve cone 46 which is determined by opening 49 towards pressure chamber 50 is acted upon by the pressure of pressure chamber 50 in opposition to the force of spring 47. Above a specific pressure, the force acting on piston 55 will be of a magnitude sufficient to displace it against the force of spring 47 and valve cone 46 will be unseated from opening 49. The fluid flow of the hydraulic brake booster is then in direct communication with pressure chamber 50. The static brake circuit has turned into a dynamic brake circuit.

In order to obtain a true dynamic brake force control with a brake control valve, booster piston 3 of the brake booster will be locked in position with the fluid volume applied to pressure chamber 50. This is accomplished by valve 40 which is closed by the fluid pressure in opposition to a spring 42, thereby closing fluid chamber 17. Since in the event of a movement of booster piston 3 in the actuating direction 44 this fluid chamber has to become smaller, booster piston 3 cannot be moved further in the actuating direction 44 with fluid chamber 17 closed, because the cut-off volume is incompressible. Booster piston 3 is hydraulically locked in position in the actuating direction.

The change-over point of valve 40 is adapted to the switching pressure level in pressure chamber 50 so that the change-over to the dynamic brake system and the locked condition of booster piston 3 take place simultaneously.

With booster piston 3 immobile, central piston 4 continues to act merely as a brake control valve. The pressure of the dynamic circuit acting on the end surface of central piston 4 in bore 15 acts via disc spring assembly 6 and piston section 5 on the brake pedal (not shown). Above a specific force, which is adapted to the change-over point of valve 40, disc spring assembly 6 will be compressed, thereby acting as a true travel/force simulator for the brake pedal. Disc spring assembly 6 is constructed such that the travel/force simulator takes effect only if booster piston 3 is locked in position and central piston 4 operates as a brake control valve.

In the event of a control by the wheel slip control apparatus taking place, in the operating state below the switching pressure level in pressure chamber 50, the following mode of operation of piston 55 will occur. If the pressure is lowered in a wheel cylinder associated with pressure chamber 50 (e.g., valve 64 closed, valve 65 open), the pressure drop will also take effect in the associated control chamber (61, for instance). The force acting on the associated annular surface (71) will become less so that the force on annular surface 69 will cause displacement of piston 55 in opposition to the still acting force of spring 47, directing the fluid flow into pressure chamber 50.

If the pressure is again built up in the associated wheel cylinder (valve 64 open, valve 65 closed), the necessary volume will be provided by the fluid flow through pressure chamber 50. The position of master cylinder piston 2 will not be affected. When the pressure in the wheel cylinder has again reached the pressure in master cylinder pressure chamber 50, the sum of the forces acting on annular surfaces 69, 70 and 71 will become zero, piston 55 will again be displaced by the force of spring 47, and opening 49 will be closed. The static brake circuit will be re-established.

This mode of operation ensures that the volume of pressure chamber 50 cannot become exhausted independently of the pressure level in master cylinder pressure chamber 50.

In the event of a failure of the fluid flow, full operability of the static master cylinder brake circuit will be ensured. The wheel slip control apparatus will sense fluid flow failure by apparatus not shown and will stop the delivery of control signal to the valves 64–67, and these will assume their de-energized normal positions in which they connect the wheel cylinders to the static brake circuit. Even if piston 55 is displaced when the switching pressure level in pressure chamber 50 is attained, thus opening opening 49, check valve 87 will prevent any volume loss in master cylinder pressure chamber 50.

Figure 2:
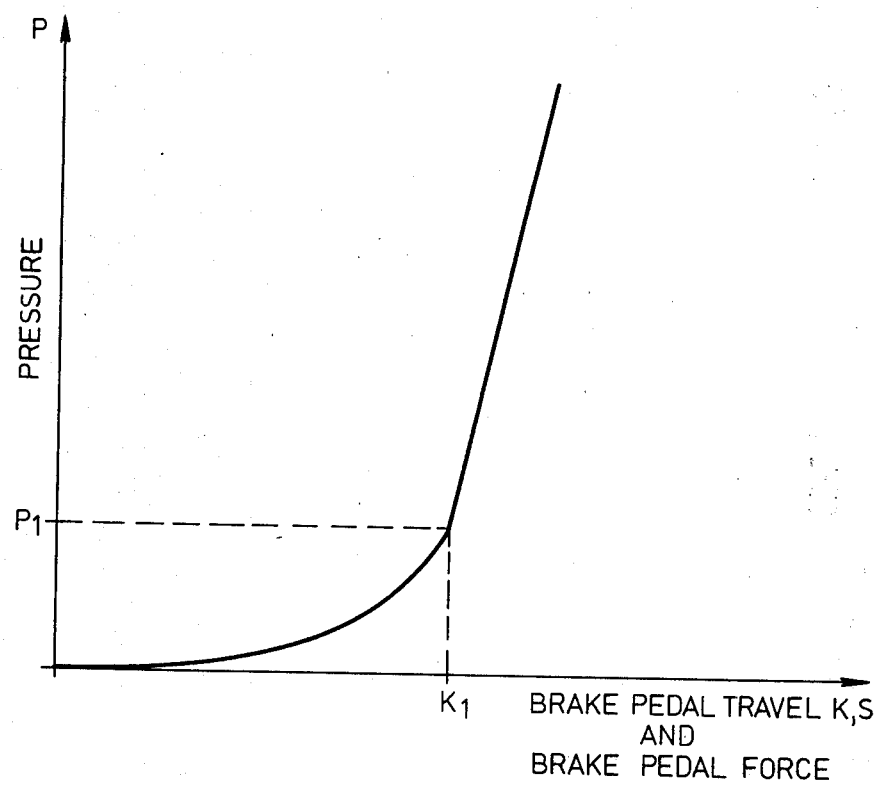
FIG. 2 is a graph showing the pressure in the pressure chamber plotted against the pedal force.

FIG. 2 reflects diagrammatically the course of pressure P plotted against K, S in pressure chamber 50. Until point K1, pressure P1 is built up by the brake pedal or the brake booster. From pressure P1 on, the fluid volume controlled by the brake pedal will be directly delivered into pressure chamber 50 so that a very high pressure is allowed to build up with a lower brake pedal travel S at relatively lower expenditure of force K. If the wheel slip control apparatus takes care of the control function, it is ensured, on the one hand, that the pressure in the pressure chamber 50 cannot drop, i.e., master cylinder piston 2 will not move and the brake pedal will remain in its position, and, on the other hand, sufficient fluid volume is available to effect a control operation.

While I have described above the principles of my invention in connection with specific apparatus it is to be clearly understood that this description is made only by way of example and not as a limitation to the scope of my invention as set forth in the objects thereof and in the accompanying claims.

I claim:

1. A hydraulic brake system for a vehicle comprising:
   a master cylinder having a pressure chamber;
   at least two wheel brake cylinders;
   at least two wheel slip control valves each coupled between said pressure chamber and a different one of said two brake cylinders to control the pressure in the associated one of said two brake cylinders independently of the pressure in said pressure chamber in the event of an imminent locked condition of a wheel, the pressure in each of said two brake cylinders being lower than the pressure in said pressure chamber by a predetermined amount; and a valve device coupled to a pressurized fluid source, said pressure chamber and said two brake cylinders to control fluid flow from said fluid source to said pressure chamber, said valve device being responsive to a differential of pressure between the pressure in said pressure chamber and the pressure of each of said two brake cylinders.

2. A system according to claim 1, wherein said valve device is opened above a specific pressure level in said pressure chamber.

3. A system according to claim 2, further including a hydraulic brake booster having a booster piston coupled between said fluid source and said valve device, said booster having means to immovably lock said booster piston in place in an actuating direction above said specific pressure level.

4. A system according to claim 3, wherein said means includes
a valve actuated by the pressure of said fluid flow to disconnect a fluid chamber from an unpressurized reservoir, said fluid chamber having a volume that becomes smaller when said booster piston moves in said actuating direction.

5. A system according to claims 3 or 4, wherein said booster further includes
a central piston disposed coaxial within said booster piston to control the operation of said booster,
a brake pedal actuated means to operate said central piston, and
a travel/force simulator disposed between said central piston and said brake pedal actuated means.

6. A system according to claim 5, wherein said simulator includes
a stacked disc spring assembly disposed coaxially about said central piston and having one end bearing against a collar on said central piston and the other end bearing against an adjacent end of said brake pedal actuated means.

7. A system according to claim 6, wherein said brake pedal actuated means is connected to said central piston by a lost-motion coupling.

8. A system according to claim 5, wherein said fluid flow is the controlled fluid flow of said booster.

9. A system according to claim 2, wherein said valve device includes
a multiple stepped piston urged into a sealing engagement with an opening formed in an outer wall of said pressure chamber by a spring, said stepped piston having at least a first surface acted upon by fluid in said pressure chamber in a sense of opening said valve device and at least a second surface acted upon by pressure in said two brake cylinders in a sense of closing said valve device.

10. A system according to claim 9, wherein said first surface includes
a first annular surface disposed adjacent said pressure chamber acted upon by the pressure in said pressure chamber in a sense of opening said valve device, and
said second surface includes
second and third annular surfaces spaced from each other, said pressure chamber and said first annular surface each acted upon by the pressure in a different one of said two brake cylinders in a sense of closing said valve device.

11. A system according to claim 10, wherein the effective area of said second annular surface plus the effective area of said third annular surface equals the effective area of said first annular surface.

12. A system according to claims 9 or 10, wherein said first surface further includes
a first end surface of said stepped piston adjacent said pressure chamber acted upon by pressure in said pressure chamber in opposition to the force of said spring, and
said stepped piston includes
a second end surface remote from said pressure chamber acted upon by atmospheric pressure.

13. A system according to claim 12, wherein the force of said spring determines said specific pressure level.

14. A system according to claim 13, wherein said fluid flow is controlled by the pressure in said pressure chamber.

15. A system according to claim 12, wherein said first end surface is disposed on a section of said stepped piston terminating in a chamber spaced from said first end surface communicating with said fluid flow, said section being formed as a valve cone adjacent said first end surface to control said opening in said outer wall of said pressure chamber.

16. A system according to claim 15, wherein said valve cone includes
an axial bore connecting said pressure chamber with a chamber bounded by said first annular surface.

17. A system according to claim 1, wherein said fluid flow is controlled by the pressure level in said pressure chamber.

18. A system according to claim 1, further including a check valve coupled between said fluid source and said valve device to pass said fluid flow toward said valve device.

19. A system according to claim 1, wherein said master cylinder further includes
a master cylinder piston having one end thereof providing a boundary for said pressure chamber,
a cup seal disposed adjacent said one end of said master cylinder piston, and
a leakage warning device associated with said cup seal to provide an indication in the event of a leak in said cup seal.

20. A system according to claim 19, wherein said warning device includes
a warning device piston disposed in a first chamber in communication with that side of said cup seal spaced from said pressure chamber and in a seated relationship with a valve seat disposed adjacent a second chamber connected to an unpressurized reservoir, said warning device piston having an opening therethrough between said first and second chambers,
a rubber-type lamella disposed in said first chamber to close said opening during periods of fluid flow through said cup seal, and
a pressure-responsive warning indicator coupled to said first chamber to provide an indication when pressure builds up in said first chamber due to said lamella closing said opening.

* * * * *